(12) United States Patent
Triller et al.

(10) Patent No.: US 8,119,825 B2
(45) Date of Patent: Feb. 21, 2012

(54) METHOD FOR THE PRODUCTION OF MULTIMETAL CYANIDE COMPOUNDS

(75) Inventors: Michael Triller, Mannheim (DE); Raimund Ruppel, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 816 days.

(21) Appl. No.: 12/095,805

(22) PCT Filed: Nov. 23, 2006

(86) PCT No.: PCT/EP2006/068841
§ 371 (c)(1),
(2), (4) Date: Jun. 2, 2008

(87) PCT Pub. No.: WO2007/082596
PCT Pub. Date: Jul. 26, 2007

(65) Prior Publication Data
US 2008/0300376 A1    Dec. 4, 2008

(30) Foreign Application Priority Data
Dec. 2, 2005 (DE) .......... 10 2005 057 895

(51) Int. Cl.
- C07F 15/00 (2006.01)
- C01B 21/06 (2006.01)
- C08G 18/00 (2006.01)

(52) U.S. Cl. .......... 556/138; 423/364; 528/52
(58) Field of Classification Search .......... 556/138; 528/52; 423/364
See application file for complete search history.

(56) References Cited

U.S. PATENT DOCUMENTS

| | | | |
|---|---|---|---|
| 3,278,457 A | 10/1966 | Milgrom | |
| 6,063,897 A | 5/2000 | Le-Khac et al. | |
| 6,362,126 B1 | 3/2002 | Grosch et al. | |
| 6,689,710 B2 | 2/2004 | Grosch et al. | |
| 6,696,383 B1 | 2/2004 | Le-Khac et al. | |
| 6,764,978 B2 | 7/2004 | Grosch et al. | |
| 6,780,813 B1 | 8/2004 | Hofmann et al. | |
| 7,015,364 B2 | 3/2006 | Grosch et al. | |
| 2002/0198099 A1 | 12/2002 | Ooms et al. | |
| 2003/0158449 A1 | 8/2003 | Hofmann et al. | |
| 2006/0223972 A1 | 10/2006 | Hinz et al. | |

FOREIGN PATENT DOCUMENTS

| | | |
|---|---|---|
| EP | 0 090 444 | 10/1983 |
| EP | 1 254 714 | 11/2002 |
| EP | 1 258 291 | 11/2002 |
| EP | 1 400 281 | 3/2004 |
| WO | 99 44739 | 9/1999 |
| WO | 99 56874 | 11/1999 |
| WO | 01 04180 | 1/2001 |
| WO | 01 39883 | 6/2001 |
| WO | 01 64772 | 9/2001 |
| WO | 01 80994 | 11/2001 |
| WO | 2004 020091 | 3/2004 |
| WO | 2004 044034 | 5/2004 |
| WO | 2006 103212 | 10/2006 |

Primary Examiner — Porfirio Nazario Gonzalez
(74) Attorney, Agent, or Firm — Oblon, Spivak, McClelland, Maier & Neustadt, L.L.P.

(57) ABSTRACT

Process for preparing multimetal cyanide compounds, which comprises the steps a) reaction of the aqueous solution of a metal salt of the general formula (I)

$$M^1_g X_n \quad\quad (I)$$

With the aqueous solution of a cyanometalate compound of the general formula (II)

$$M^3_r[M^2(CN)_b]_d, \quad\quad (II),$$

If appropriate in the presence of organic ligands, organic additives and/or surface-active agents, to form a multimetal cyanide compound of the general formula (III)

$$M^1_a[M_2(CN)_b]_d \cdot fM^1_j X_k \cdot h(H_2O) \cdot eL \cdot zP \quad\quad (III)$$

b) reaction of the multimetal cyanide compound of the general formula (III) with a salt of the general formula (IV)

$$M^4_s Y_t \quad\quad (IV)$$

which is different from general formula (II) where $M^1$, $M^2$, $M^3$, $M^4$, X, L, P, Y, g, n, r, b, d, a, f, j, k, h, e, z, s, and t are defined in the specification.

13 Claims, No Drawings

METHOD FOR THE PRODUCTION OF MULTIMETAL CYANIDE COMPOUNDS

The invention relates to a process for preparing multimetal cyanide compounds which can be used, in particular as catalysts for the ring-opening polymerization of alkylene oxides.

Multimetal cyanide catalysts, also referred to as DMC catalysts, are effective catalysts for the preparation of polyetherols by ring-opening polymerization of alkylene oxides. Said products are employed, for example, as starting materials for the production of polyurethanes by reaction with polyisocyanates, as surface-active compounds or as carrier oils in industry.

The use of multimetal cyanide compounds as catalysts makes it possible to prepare polyether alcohols having a reduced content of unsaturated by-products. Furthermore, the reaction rate in the addition reaction of the alkylene oxides is considerably higher compared to the customary basic catalysts and the plant capacity is thus also significantly higher.

The DMC catalysts are usually prepared by reacting a metal salt with a cyanometalate compound. To improve the properties of the DMC catalysts, it is customary to add organic ligands during and/or after the reaction. A description of the preparation of DMC catalysts may be found, for example, in U.S. Pat. No. 3,278,457.

However, the DMC catalysts have disadvantages. Thus, the start of the reaction can be delayed. This delay is frequently also referred to as an induction period. A further disadvantage is the formation of the high molecular weight material in the polyether alcohol. This high molecular weight material can have a very adverse effect in the further processing to form polyurethanes.

One possible way of overcoming these disadvantages is to improve the DMC catalysts. A large number of structures of DMC catalysts are described in the prior art. Here, the DMC catalysts can be varied in terms of the morphology, the type of organic ligands used or the use of additives.

Thus, EP 1 400 281 describes the addition of functional polymers to improve the selectivity of the DMC catalysts.

EP 090 444 describes a process for preparing polyether alcohols using DMC catalysts in which the DMC catalyst is used together with an acid for preparing polyether alcohols.

WO 01/64772 describes a process for preparing DMC catalysts, in which a DMC catalyst is prepared first and this is then subjected to a recrystallization.

WO 2004/020091 describes a process for preparing DMC catalysts, in which the DMC catalyst is subjected to a phase change after its preparation.

It is an ever-present object to increase the activity of DMC catalysts and to shorten their induction periods.

We have surprisingly found that an improvement in the activity of the DMC catalysts can be achieved when the DMC catalysts are treated, after having been precipitated, with a metal salt which is different from the metal salt by means of which the precipitation of the DMC catalyst was carried out.

The invention accordingly provides a process for preparing multimetal cyanide compounds, which comprises the steps a) reaction of the aqueous solution of a metal salt of the general formula (I)

$$M^1_g X_n \quad (I)$$

with the aqueous solution of a cyanometalate compound of the general formula (II)

$$M^3_r[M^2(CN)_b]_d, \quad (II),$$

if appropriate in the presence of organic ligands, organic additives and/or surface-active agents, to form a multimetal cyanide compound of the general formula (III)

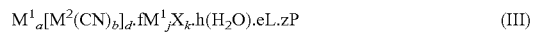

$$M^1_a[M^2(CN)_b]_d \cdot fM^1_j X_k \cdot h(H_2O) \cdot eL \cdot zP \quad (III)$$

b) reaction of the multimetal cyanide compound of the general formula (III) with a salt of the general formula (IV)

$$M^4_s Y_t \quad (IV),$$

which is different from (II) where $M^1$ is a metal ion selected from the group consisting of $Zn^{2+}$, $Fe^{2+}$, $Fe^{3+}$, $Co^{2+}$, $Co^{3+}$, $Ni^{2+}$, $Mn^{2+}$, $Sn^{2+}$, $Sn^{4+}$, $Pb^{2+}$, $Al^{3+}$, $Sr^{2+}$, $Cr^{3+}$, $Cd^{2+}$, $Cu^{2+}$, $La^{3+}$, $Ce^{3+}$, $Ce^{4+}$, $Eu^{3+}$, $Mg^{2+}$, $Ti^{4+}$, $Ag^+$, $Rh^{2+}$, $Ru^{2+}$, $Ru^{3+}$, $Pd^{2+}$ $M^2$ is a metal ion selected from the group consisting of $Fe^{2+}$, $Fe^{3+}$, $Co^{2+}$, $Co^{3+}$, $Mn^{2+}$, $Mn^{3+}$, $Ni^{2+}$, $Cr^{2+}$, $Cr^{3+}$, $Rh^{3+}$, $Ru^{2+}$, $Ir^{3+}$ and $M^1$ and $M^2$ are identical or different, X is an anion, selected from the group consisting of halide, hydroxide, sulfate, hydrogensulfate, carbonate, hydrogencarbonate, cyanide, thiocyanate, isocyanate, cyanate, carboxylate, oxalate, nitrate and nitrite ($NO_2^-$) or a mixture of two or more of the abovementioned anions or a mixture of one or more of the abovementioned anions with an uncharged species selected from among CO, $H_2O$ and NO, Y is an anion which is different from X and is selected from the group consisting of halide, sulfate, hydrogensulfate, disulfate, sulfite, sulfonate, ($=RSO_3$—where R=C1-C20-alkyl, aryl, C1-C20-alkylaryl), carbonate, hydrogencarbonate, cyanide, thiocyanate, isocyanate, isothiocyanate, cyanate, carboxylate, oxalate, nitrate, nitrite, phosphate, hydrogenphosphate, dihydrogenphosphate, diphosphate, borate, tetraborate, perchlorate, tetrafluoroborate, hexafluorophosphate, tetraphenylborate, L is a water-miscible ligand selected from the group consisting of alcohols, aldehydes, ketones, ethers, polyethers, esters, polyesters, polycarbonate, ureas, amides, nitriles, and sulfides and mixtures thereof, P is an organic additive, selected from the group consisting of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylate, polyalkyl methacrylate, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface- and interface-active compounds, bile acids, and their salts, esters and amides, carboxylic esters of polyhydric alcohols and glycosides, and a, b, d, g, n, r, s, j, k and t are integers or fractions greater than zero, e, f, h and z are integers or fractions greater than or equal to zero, where a, b, d, g, n, j, k and r and also s and t are selected so that the compound is electrically neutral, $M^3$ is hydrogen or an alkali metal or alkaline earth metal, and $M^4$ is an alkali metal ion or an ammonium ion ($NH_4^+$) or an alkylammonium ion ($R_4N^+$, $R_3NH^+$, $R_2NH_2^+$, $RNH_3^+$ where R=C1-C20-alkyl).

The invention also provides the DMC catalysts prepared by this process, provides for the use for preparing polyether alcohols and provides a process for preparing polyether alcohols by addition of alkylene oxides onto H-functional starter substances, wherein the DMC catalysts prepared by the process of the invention are used as catalysts.

In a particularly preferred embodiment of the invention, $M^1$ is $Zn^{2+}$ and $M^2$ is $Co^{3+}$ or $CO^{2+}$.

The metals $M^1$ and $M^2$ are identical when, in particular, they are cobalt, manganese or iron.

The steps a) and b) of the process of the invention can be carried out in direct succession or separated from one another in time and/or space.

The salt (IV) used can also be a mixture of at least two salts. However, this embodiment is less preferred.

As stated, multimetal cyanide compounds of the general formula (III) are firstly prepared from a metal salt of the general formula (I) and a cyanometalate compound of the general formula (II) in step a) of the process of the invention.

The DMC catalysts of the general formula (III) can be crystalline or amorphous. When z is zero, crystalline double metal cyanide compounds are preferred. When z is greater than zero both crystalline, partially crystalline and substantially amorphous catalysts are preferred.

A preferred embodiment comprises catalysts of the formula (III) in which z is greater than zero.

The preferred catalyst then comprises:
a) at least one multimetal cyanide compound
b) at least one organic ligand
c) at least one organic additive P.

In another preferred embodiment of the catalysts of formula (III) z is zero, e is optionally also zero and X is exclusively carboxylate, preferably formate, acetate and propionate. Such compounds are, for example, described in WO 99/16775. In this embodiment, crystalline multimetal cyanide catalysts are preferred.

Preference is also given to multimetal cyanide catalysts which are crystalline and platelet-like, as described, for example, in WO 00/74845.

In an other embodiment of the DMC catalysts of the formula (III), e, f and z are not equal to zero. These are then DMC catalysts which comprise a water-miscible organic ligand (generally in amounts of from 0.5 to 30% by weight) and an organic additive (generally in amounts of from 5 to 80% by weight) (WO 98/06312). The catalysts can, for example, be prepared with vigorous stirring (e.g. >20 000 rpm by means of an UltraTurrax®) or under other shear stress.

DMC catalysts of the formula (III) which are likewise suitable are described in WO 01/03830. These DMC catalysts are prepared using organic sulfones of the general formula R—S(O)$_2$—R or sulfoxides of the general formula R—S(O)—R as organic complexing agent.

Further DMC catalysts of the formula (III) comprising metal [hexacyanometalate-hexanitrometalate] are mentioned in the patent application WO 01/04182. The starting compounds mentioned there are less expensive than the zinc hexacyanocobaltates generally used. The DMC catalysts prepared in this way can also be supported, as described in the patent applications WO 01/04180 and WO 01/04177. The catalyst can be separated off in a simple fashion as a result. However, attrition of the supported catalysts can occur here.

A DMC catalyst of the formula (III) which is likewise suitable can be prepared on the basis of hexacyanocobaltate-nitroferrocyanide as described in WO 01/04181. The catalysts can be separated off after step a) and worked up and dried if appropriate. To carry out step b) they are then resuspended. This can be achieved, for example, by suspending them in water and adding the salt of the formula (IV), either as solid or preferably in the form of an aqueous solution, to the suspension. It is also possible to suspend the DMC catalyst of the formula (III) in the aqueous solution of the salt of the formula (IV) in order to carry out step b). Here, the suspension can further comprise ligands, surface-active agents or other compounds.

The solution of the salt (IV) can be prepared by dissolution of the salt in water. It is also possible to form the salts in situ by addition of the appropriate acids and bases.

Preference is given to suspending the catalysts of the formula (III) in the aqueous solution of the salt of the formula (IV).

The concentration of the salt solution is preferably from 0.1% to 30% by weight, preferably from 0.5% to 15% by weight, particularly preferably from 1% to 10% by weight, provided that the solubility of the salt of the formula (IV) allows this. The proportion of the DMC catalyst of the formula (III) in the suspension is from 1 to 30% by weight, preferably from 1 to 20% by weight, particularly preferably from 3 to 15% by weight. The suspension procedure and the step b) are carried out, in particular, in the range from room temperature to the boiling point of the aqueous salt solution and can be repeated a number of times. The last suspension step can optionally be followed by a plurality of washing steps, using deionized water.

The treatment of the DMC catalysts of the formula (III) in the aqueous salt solution of the salt (IV) can be carried out under reduced pressure or superatmospheric pressure, preferably at a pressure in the range from 200 to 1200 hPa.

In a further embodiment, step b) is carried out by washing a filter cake of the catalyst of the formula (III) on a filter with an aqueous solution of a salt of the formula (IV), i.e. by passing the aqueous salt solution through the filter cake. The filter cake can be formed directly in the separation of the catalyst of the formula (III) from the aqueous phase and be further treated while still on the filter or a finished DMC catalyst of the formula (III) can be converted into filter cake formed by suspending it in deionized water and thus applying it to the filtration apparatus. The treatment with the salt solution is carried out subsequently. The concentrations and the temperature are as described above.

The pH of the aqueous solution of the salt (IV) is preferably in the range from 4 to 7. If the pure solution has a different pH, this can be adjusted by addition of acid or base.

The treatment of the DMC catalysts of the formula (III) in step b) can result in ion exchange in the catalyst and/or to impregnation of the catalyst with the salt (IV).

In the case of ion exchange, the catalyst resulting from step b) has the general formula (V), where the symbols are as defined for the formulae (I) to (IV).

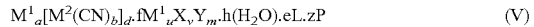  (V)

In the case of impregnation, the catalyst resulting from step b) has the general formula (VI), where the symbols are as defined for the formulae (I) to (IV),

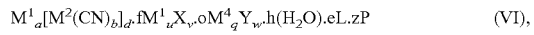  (VI), where u, v, m, o, q and w are integers or fractions greater than zero and are selected so that the compound is electrically neutral and the other coefficients and indices are as defined for the general formulae (I) to (IV).

Preference is given to ion exchange taking place to give a compound of the formula (V). In the DMC catalysts of the invention, it is frequently the case that both species of the general formula (V) and ones of the general formula (VI) are present. It is preferred that ion exchange has taken place in at least part of the treated catalyst.

The process of the invention makes it possible to obtain DMC catalysts having a significantly improved catalytic activity. When the catalysts of the invention are used for preparing polyether alcohols, the induction period is greatly shortened. In addition, the amount of catalyst can be reduced.

As stated, the DMC catalysts of the invention are used for preparing polyether alcohols by addition of alkylene oxides onto H-functional starter substances.

As alkylene oxides, it is possible to use all known alkylene oxides, for example ethylene oxide, propylene oxide, butylene oxide, styrene oxide. In particular, ethylene oxide, propylene oxide and mixtures of the compounds mentioned are used as alkylene oxides.

To prepare polyether alcohols for use as raw materials for polyurethane production, polyfunctional alcohols, in particular are used as starter substances and ethylene oxide and/or propylene oxide are preferably used as alkylene oxides. It is also possible to incorporate carbon dioxide into the polyether chain in addition to the alkylene oxides.

As H-functional starter substances use is made of monofunctional or polyfunctional compounds. In particular, use is made of alcohols having a functionality of from 1 to 8, preferably from 2 to 8. To prepare polyether alcohols which are used for flexible polyurethane foams, preference is given to using alcohols having a functionality of from 2 to 4, in particular 2 and 3, as starter substances. Examples are ethylene glycol, propylene glycol, glycerol, trimethylolpropane, pentaerythritol. When the alkylene oxides are added on by means of DMC catalysts, it is advantageous to use the reaction products of the alcohols mentioned with alkylene oxides, in particular propylene oxide, together with or in place of the alcohols. Such compounds preferably have a molar mass up to 500 g/mol. The addition reaction of the alkylene oxides in the preparation of these reaction products can be carried out using any catalysts, for example, basic catalysts. The polyether alcohols for the production of flexible polyurethane foams usually have a hydroxyl number in the range from 20 to 100 mg KOH/g.

The addition reaction of the alkylene oxides in the preparation of the polyether alcohols used for the purposes of the process of the invention can be carried out by known methods. Thus, it is possible for the polyether alcohols to comprise only one alkylene oxide. When a plurality of alkylene oxides are used, blockwise addition in which the alkylene oxides are added on individually in succession or random addition in which the alkylene oxides are metered in together, is possible. It is also possible to incorporate both blocks and random segments into the polyether chain in the preparation of the polyether alcohols.

The addition reaction of the alkylene oxides is carried out under conditions customary for this purpose, e.g. temperatures in the range from 60 to 180° C., preferably from 90 to 140° C., in particular from 100 to 130° C. and pressures in the range from 0 to 20 bar, preferably in the range from 0 to 10 bar and in particular in the range from 0 to 5 bar. The mixture of starter substance and DMC catalyst can be pretreated by stripping in accordance with the teachings of WO 98/52689 prior to the commencement of the alkoxylation.

After the addition reaction of the alkylene oxide is complete, the polyether alcohol is usually worked up according to customary methods by removing the unreacted alkylene oxides and also volatile constituents, usually by distillation, steam or gas stripping and/or other methods of deodorization. If necessary, a filtration can also be carried out.

After conclusion of the addition reaction of the alkylene oxides the catalyst can be separated off from the reaction mixture. However, it is possible to leave it in the product for most uses of the polyether alcohol, in particular in the production of polyurethanes.

In a particular embodiment, the preparation of the polyether alcohols can also be carried out continuously. Such a process is described, for example, in WO 98/03571 or in JP H6-16806. Here, alkylene oxides and starter substance are metered continuously into a continuous reactor and the polyether alcohol formed is taken off continuously.

The monofunctional polyether alcohols obtained are usually employed as surface-active compounds. The polyfunctional polyether alcohols are usually reacted with polyisocyanates to form polyurethanes.

The invention is illustrated by the following examples.

EXAMPLES

Preparation of Catalyst
Catalyst A (Comparison)

370 kg of aqueous hexacyanocobaltic acid (Co content=9 g/l, prepared from potassium hexacyanocobaltate by ion exchange) were placed in a stir vessel which had a volume of 800 l and was equipped with an inclined blade stirrer, an immersed tube for introduction and a conductivity measurement cell and heated to 50° C. while stirring. 210 kg of aqueous zinc acetate dihydrate solution (Zn content=2.7% by weight) which had also been heated to 50° C. were subsequently added over a period of 50 minutes while stirring. A solution of 8 kg of Pluronic® PE 6200 (BASF AG) in 10.7 kg of water was subsequently added. The reaction mixture was heated to 55° C. A further 67.5 kg of aqueous zinc acetate dihydrate solution (Zn content=2.7% by weight) which had likewise been heated to 55° C. were subsequently added over a period of 20 minutes. The reaction mixture was stirred for a further 1 hour and filtered by means of a filter press. The solid was finally washed with 400 l of deionized water.

Catalyst B (Comparison)

300 kg of a 4.9% strength by weight aqueous $K_3[Co(CN)_6]$ solution were placed in a stir vessel which had a volume of 800 l and was equipped with an inclined blade stirrer, an immersed tube for introduction and a conductivity measurement cell. 15 kg of 20% strength sulfuric acid were added while stirring and the initial charge was heated to 25° C. 176 kg of an aqueous $Zn(OAc)_2.2H_2O$ solution (Zn content=2.5% by weight) were subsequently added over a period of 45 minutes. 72 kg of a 41.8% by weight aqueous solution of Pluronic® PE 6200 (BASF AG) were then added and the reaction mixture was heated to 55° C. A further 57.6 kg of an aqueous $Zn(OAc)_2.2H_2O$ solution (Zn content=2.5% by weight) were then introduced over a period of 7 minutes and the reaction mixture was stirred for another 60 minutes. The reaction mixture was stirred for a further 1 hour and filtered by means of a filter press. The solid was finally washed with 1410 l of deionized water.

Catalyst 1 (According to the Invention)

50 g of catalyst B were heated in 1 l of a 5% strength by weight aqueous solution of potassium sulfite whose pH had been adjusted to 6 by means of sulfuric acid for 3 hours while stirring under reflux. After cooling, the DMC catalyst was filtered off with suction and washed with deionized water.

Catalyst 2 (According to the Invention)

50 g of catalyst A were suspended in 1 l of a 5% strength by weight aqueous solution of sodium thiocyanate for 2 hours while stirring. The DMC catalyst was filtered off with suction and once again suspended in 1 l of a 5% strength by weight aqueous solution of sodium thiocyanate for 2 hours while stirring. The DMC catalyst was subsequently filtered off with suction and washed with deionized water.

Catalyst 3 (According to the Invention)

50 g of catalyst A were heated in 1 l of a 15% strength by weight aqueous solution of potassium thiocyanate for 3 hours while stirring under reflux. After cooling, the DMC catalyst was filtered off with suction and washed with deionized water.

Catalyst 4 (According to the Invention)

50 g of catalyst A were heated in 1 l of a 0.5% strength by weight aqueous solution of potassium perchlorate for 3 hours while stirring under reflux. After cooling, the DMC catalyst was filtered off with suction and washed with deionized water.

Catalyst 5 (According to the Invention)

50 g of catalyst A were heated in 1 l of a 5% strength by weight aqueous solution of potassium thiocyanate for 3 hours while stirring under reflux. After cooling, the DMC catalyst was filtered off with suction and washed with deionized water.

Catalyst 6 (According to the Invention)

50 g of catalyst B were briefly slurried in 1 l of a 5% strength by weight aqueous solution of potassium bromide. The homogenous suspension was placed in a round-bottom flask, hung on a rotary evaporator and rotated at 50° C. and 75 mbar for 2 hours, with the liquid which distilled off being replaced by deionized water so that the suspension did not dry up. The DMC catalyst was filtered off with suction and the above-described treatment was carried out again using fresh solution. The DMC catalyst was subsequently filtered off with suction and washed with deionized water.

Catalyst 7 (According to the Invention)

50 g of catalyst B were heated in 1 l of a 5% strength by weight aqueous solution of potassium borate, prepared from aqueous boric acid solution by addition of potassium hydroxide to a pH of 6 for 2 hours while stirring under reflux. The DMC catalyst was filtered off with suction and the above-described treatment was carried out again using fresh solution. The DMC catalyst was subsequently filtered off with suction and washed with deionized water.

Catalyst 8 (According to the Invention)

50 g of catalyst B were heated in 1 l of a 5% strength by weight aqueous solution of potassium disulfate whose pH had been adjusted to 6 by means of potassium hydroxide for 2 hours while stirring under reflux. The DMC catalyst was filtered off with suction and the above-described treatment was carried out again using fresh solution. The DMC catalyst was subsequently filtered off with suction and washed with deionized water.

Catalyst 9 (According to the Invention)

50 g of catalyst B were briefly slurried in 200 ml of deionized water and filtered off with suction on a glass sinter frit. The moist filter cake was washed slowly with 2 l of a 5% strength by weight aqueous solution of potassium thiocyanate over a period of 3 hours while still on the glass sinter frit. The DMC catalyst was subsequently washed with deionized water.

Catalyst 10 (According to the Invention)

50 g of catalyst B were heated in 1 l of a 5% strength by weight aqueous solution of potassium benzoate for 2 hours while stirring under reflux. The DMC catalyst was filtered off with suction and the above-described treatment was carried out again using fresh solution. The DMC catalyst was subsequently filtered off with suction and washed with deionized water.

Determination of the Catalyst Activity

In a 250 ml stirring autoclave, 64 g of DMC catalyst which had been dried beforehand at 40° C. for 16 hours were finely dispersed in 64 g of a glycerol propoxylate having a molar mass of about 900 g/mol (hereinafter referred to as VP900) for 5 minutes by means of an Ultraturrax apparatus. The reactor was subsequently closed and evacuated to 3 mbar at a temperature of 100° C. for 2 hours. The reactor was subsequently heated to 130° C., 36 g of propylene oxide were introduced over a period of 2 minutes and the pressure and time curves were recorded. After all of the propylene oxide had reacted which could be seen from the drop in pressure to a constant level, the autoclave was made inert by means of nitrogen, the reaction product was degassed at 10 mbar and was drained from the autoclave at 100° C. and the yield was determined. To obtain measures of the activity, the time to occurrence of the maximum determined (induction period), the maximum temperature and the maximum pressure were taken from the recorded curves.

| Catalyst | Concentration [ppm] | Induction period [min] | Max. temp. [° C.] | Max. pressure [bar] | Yield [g] |
|---|---|---|---|---|---|
| Catalyst 1 | 50 | 3 | 229 | 10.6 | 97 |
| Catalyst 2 | 50 | 6 | 243 | 10.7 | 97 |
| Catalyst 3 | 50 | 3 | 246 | 10.4 | 97 |
| Catalyst 4 | 50 | 4 | 232 | 10.4 | 97 |
| Catalyst 5 | 50 | 2 | 245 | 9.7 | 96 |
| Catalyst 6 | 50 | 4 | 218 | 10.3 | 97 |
| Catalyst 7 | 50 | 2 | 232 | 9.9 | 96 |
| Catalyst 8 | 50 | 2 | 235 | 9.9 | 97 |
| Catalyst 9 | 50 | 2 | 240 | 10.1 | 97 |
| Catalyst 10 | 50 | 4 | 240 | 10.9 | 97 |
| Catalyst A | 50 | 5 | 210 | 9.3 | 97 |
| Catalyst B | 50 | 4 | 215 | 9.5 | 96 |

Compared to the respective reference catalyst, all catalysts according to the invention display either a shortened induction period, a greater evolution of heat or a higher pressure.

The invention claimed is:

1. A process for preparing a multimetal cyanide compound, wherein said process comprises:

a) reaction of the aqueous solution of a metal salt of the general formula (I)

$$M^1{}_g X_n \quad (I)$$

with the aqueous solution of a cyanometalate compound of the general formula (II)

$$M^3{}_r[M^2(CN)_b]_d, \quad (II),$$

optionally in the presence of an organic ligand, an organic additive and/or a surface-active agent, to form a multimetal cyanide compound of the general formula (III)

$$M^1{}_a[M^2(CN)_b]_d \cdot fM^1{}_j X_k \cdot h(H_2O) \cdot eL \cdot zP \quad (III)$$

b) reaction of the multimetal cyanide compound of the general formula (III) with a salt of the general formula (IV)

$$M^4{}_s Y_t \quad (IV),$$

which is different from (II) where $M^1$ is a metal ion selected from the group consisting of $Zn^{2+}$, $Fe^{2+}$, $Fe^{3+}$, $Co^{2+}$, $Co^{3+}$, $Ni^{2+}$, $Mn^{2+}$, $Sn^{2+}$, $Sn^{4+}$, $Pb^{2+}$, $Al^{3+}$, $Sr^{2+}$, $Cr^{3+}$, $Cd^{2+}$, $Cu^{2+}$, $La^{3+}$, $Ce^{3+}$, $Ce^{4+}$, $Eu^{3+}$, $Mg^{2+}$, $Ti^{4+}$, $Ag^+$, $Rh^{2+}$, $Ru^{2+}$, $Ru^{3+}$, $Pd^{2+}$ $M^2$ is a metal ion selected from the group consisting of $Fe^{2+}$, $Fe^{3+}$, $Co^{2+}$, $Co^{3+}$, $Mn^{2+}$, $Mn^{3+}$, $Ni^{2+}$, $Cr^{2+}$, $Cr^{3+}$, $Rh^{3+}$, $Ru^{2+}$, $Ir^{3+}$ and $M^1$ and $M^2$ are identical or different, X is an anion, selected from the group consisting of halide, hydroxide, sulfate, hydrogensulfate, carbonate, hydrogencarbonate, cyanide, thiocyanate, isocyanate, cyanate, carboxylate, oxalate, nitrate and nitrite ($NO_2^-$) or a mixture of two or more of the abovementioned anions or a mixture of one or more of the abovementioned anions with an uncharged species selected from among CO, $H_2O$ and NO, Y is an anion which is different from X and is selected from the group consisting of halide, sulfate, hydrogensulfate, disulfate, sulfite, sulfonate, ($=RSO_3^-$ where R=C1-C20-alkyl, aryl, C1-C20-alkylaryl), carbonate, hydrogencarbonate, cyanide, thiocyanate, isocyanate, isothiocyanate, cyanate, carboxylate, oxalate, nitrate, nitrite, phosphate, hydrogenphosphate, dihydrogenphosphate, diphosphate, borate, tetraborate, perchlorate, tetrafluoroborate, hexafluorophosphate, tetraphenylborate, L is a water-miscible ligand selected from the group consisting of alcohols, aldehydes, ketones, ethers, polyethers, esters, polyesters, polycarbonate, ureas, amides, nitriles, and sulfides and mixtures thereof, P is an organic additive, selected from the group consisting of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylate, polyalkyl methacrylate, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface- and interface-active compounds, bile acids, and their salts, esters and amides, carboxylic esters of polyhydric alcohols and glycosides, and a, b, d, f, g, n, r, s, j, k and t are integers or fractions greater than zero, e, h and z are integers or fractions greater than or equal to zero, where a, b, d, g, n, j, k and r and also s and t are selected so that the compound is electrically neutral, $M^3$ is hydrogen or an alkali metal or alkaline earth metal, and $M^4$ is an alkali metal ion or an ammonium ion ($NH_4^+$) or an alkylammonium ion ($R_4N^+$, $R_3NH^+$, $R_2NH_2^+$, $RNH_3^+$ where R=C1-C20-alkyl), wherein the multimetal cyanide compound is separated off from the aqueous phase between a) and b) and the pH of the aqueous solution of the salt (IV) is from 4 to 7.

2. The process according to claim 1, wherein compound (III) is suspended in the aqueous solution of the salt of the general formula (IV) in b).

3. The process according to claim 2, wherein the suspension is refluxed in b).

4. The process according to claim 2, wherein b) is carried out at a pressure of from 200 to 1200 hPa.

5. The process according to claim 1, wherein b) is carried out by washing the solid which has been separated off in a) with an aqueous solution of the salt of the general formula (IV).

6. The process according to claim 1, wherein the concentration of the aqueous solution of the metal salt of the general formula (IV) in b) is in the range from 0.5 to 15% by weight.

7. The process according to claim 1, wherein the pH of the aqueous solution of the salt of the general formula (IV) is from 4 to 7.

8. A multimetal cyanide compound of the general formula (V)

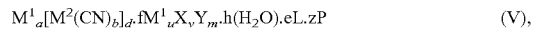

$$M^1{}_a[M^2(CN)_b]_d \cdot fM^1{}_uX_vY_m \cdot h(H_2O) \cdot eL \cdot zP \qquad (V),$$

where u, v and m are integers or fractions greater than zero and are selected so that the compound is electrically neutral and the other coefficients and indices are as defined for the general formulae (I) to (IV), which can be prepared according to claim 1.

9. A multimetal cyanide compound of the general formula (VI)

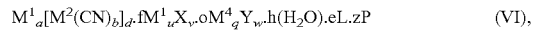

$$M^1{}_a[M^2(CN)_b]_d \cdot fM^1{}_uX_v \cdot oM^4{}_qY_w \cdot h(H_2O) \cdot eL \cdot zP \qquad (VI),$$

where o, q and w are integers or fractions greater than zero and are selected so that the compound is electrically neutral and the other coefficients and indices are as defined for the general formulae (I) to (V), which can be prepared according to claim 1.

10. A method for preparing a polyether polyol using the multimetal cyanide compound according to claim 8.

11. A method for preparing a polyether polyol using the multimetal cyanide compound according to claim 9.

12. A process for preparing a polyether alcohol comprising adding an alkylene oxide onto a H-functional starter substance, wherein multimetal cyanide compound according to claim 8 is used as a catalyst.

13. A process for preparing a polyether alcohol comprising adding an alkylene oxide onto a H-functional starter substance, wherein the multimetal cyanide compound according to claim 9 is used as a catalyst.

* * * * *